United States Patent [19]

Boyden

[11] Patent Number: 5,682,434
[45] Date of Patent: Oct. 28, 1997

[54] WEARABLE AUDIO SYSTEM WITH ENHANCED PERFORMANCE

[75] Inventor: James H. Boyden, Los Altos Hills, Calif.

[73] Assignee: Interval Research Corporation, Palo Alto, Calif.

[21] Appl. No.: 480,231

[22] Filed: Jun. 7, 1995

[51] Int. Cl.⁶ .................................................. H04R 25/00
[52] U.S. Cl. .......................................... 381/187; 381/188
[58] Field of Search ............................ 381/24, 25, 187, 381/188, 68.5; 455/89

[56] References Cited

U.S. PATENT DOCUMENTS

| | | | |
|---|---|---|---|
| 3,098,127 | 7/1963 | Huth | 381/69 |
| 3,123,678 | 3/1964 | Prentiss | 381/68.7 |
| 3,894,196 | 7/1975 | Briskey | 179/107 FD |
| 4,490,842 | 12/1984 | Watanabe | 381/86 |
| 4,764,962 | 8/1988 | Ekman et al . | |
| 4,864,610 | 9/1989 | Stevens | 379/431 |
| 4,876,724 | 10/1989 | Suzuki | 381/187 |

*Primary Examiner*—Curtis Kuntz
*Assistant Examiner*—Rexford N. Barnie
*Attorney, Agent, or Firm*—Brooks & Kushman

[57] ABSTRACT

A wearable portable entertainment and personal communication system which provides high quality sound, particularly at low audio frequencies, and which does not block or attenuate environmental sounds is disclosed. In a first embodiment, a transducer or transducer array is positioned on a wall in a sampling chamber between two cavities. One of the cavities is sealed and the other has one or more conduit members which direct the acoustic signals to one or both of the wearer's ears. In a second embodiment, both cavities have conduits, one directed to each of the wearer's ears. With either embodiment, the sampling chamber optionally can be combined with separate high frequency transducers. With both embodiments, the chambers are incorporated into a wearable garment and the transducers are connected to a source of audio signals.

18 Claims, 2 Drawing Sheets

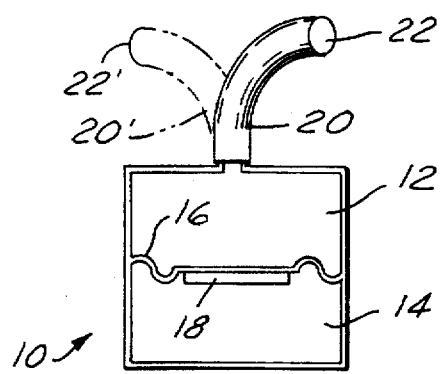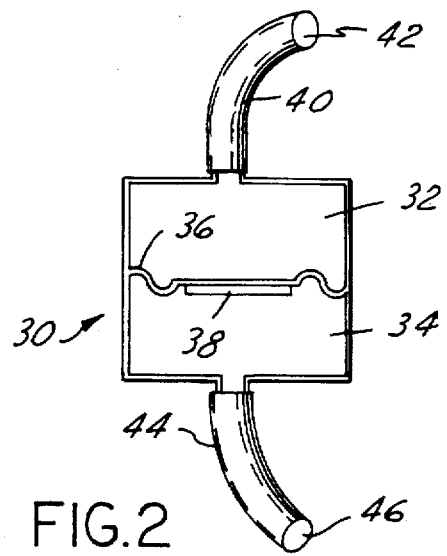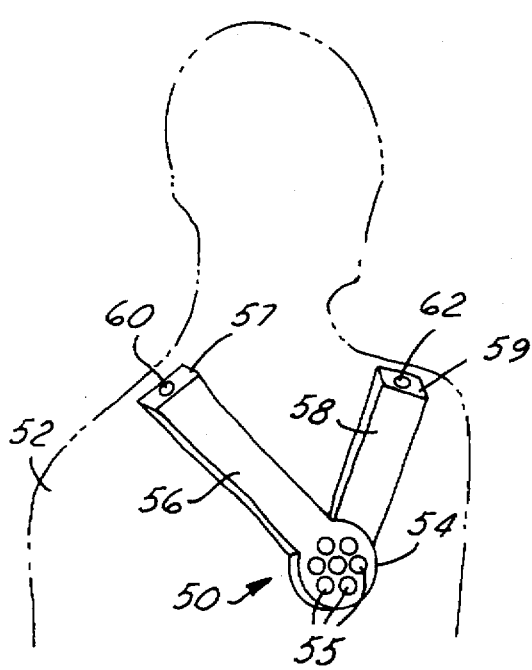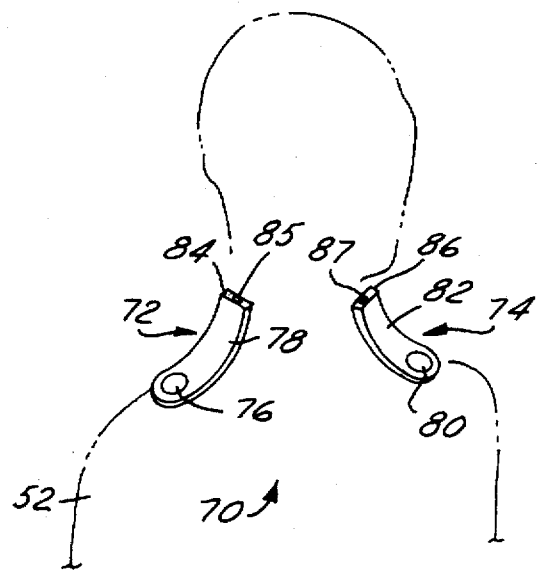
FIG.1
FIG.2
FIG.3
FIG.4

WEARABLE AUDIO SYSTEM WITH ENHANCED PERFORMANCE

TECHNICAL FIELD

The present invention relates to portable entertainment and personal communication systems, particularly wearable audio systems.

BACKGROUND OF THE INVENTION

There are many situations where it is desirable to provide audio output for personal use to be worn or carried near the body. This audio output could be used for portable entertainment, personal communications, and the like. These personal and portable communication and entertainment products include, for example, cellular and portable telephones, radios, tape players, and audio portions of portable video systems and personal monitors.

The audio output for many of these systems is typically directed to the wearer through the use of transducers physically positioned in the ear or covering the ear, such as earphones and headphones, respectively. Earphones and headphones, however, are often uncomfortable to use for long periods of time. Also, they can block or attenuate environmental sounds causing the wearer to lose contact with the surroundings. In this regard, this can compromise safety considerations if the wearer is engaging in activities such as running, driving a vehicle or operating machinery.

One common use of audio systems with earphones and headphones involves exercise and athletic events. It is quite common to see people running or exercising with headphones or earphones positioned in or covering their ears. Not only is this dangerous since the person often loses contact with external sounds and surroundings, but the earphones and headphones are subject to being dislodged as a result of the activity. Moreover, perspiration and inclement weather could affect the integrity of the speakers and audio system.

It is commonly desired to provide stereo audio output, i.e. two-channel sound, from these portable entertainment and personal communication systems. Stereo is particularly used for entertainment purposes and for other applications of spatialized audio. A stereo audio output may be provided without earphones or headphones by arranging small loud speakers (a/k/a transducers) on the body. The speakers, however, are not able to create broad-band high fidelity sound, particularly in the low frequency ranges. In this regard, loud speaker transducers are usually mounted in enclosures to confine the acoustic radiation from the rear portions of the transducer so that the radiation does not combine with out-of-phase radiation from the front portions of the transducer. Without such an enclosure, there is a significant reduction of net radiated intensity, especially in the low frequency audio ranges.

For wearable speakers, the requirement of an enclosure creates a problem. In general, the volume of the enclosure will be quite small and its acoustic stiffness will dominate the speaker behavior. The result will be a high resonance frequency and consequently a poor low frequency response.

SUMMARY OF THE INVENTION

It is an object of the present invention to provide an improved audio system for portable entertainment and personal communication systems. It is another object of the present invention to provide a portable audio system which provides high quality sound, particularly at low audio frequencies.

It is another object of the present invention to provide a wearable audio system which can be easily worn and does not interfere with the person's activity, whether sports related or otherwise. It is a still further object of the present invention to provide a wearable audio system which does not require the position of the speakers to be covering or inserted in the wearer's ears and thus overcomes a number of the problems and drawbacks with present systems.

The present invention fulfills these objects and overcomes the problems with known systems by providing a personal audio system which provides high quality sound at all audio frequencies. In accordance with the present invention, portable speakers are provided which are wearable on the person's body and provide sounds to the ears without the necessity of actually being positioned in or covering the ears. With the present invention, transmission of lower frequencies also is enhanced.

The present invention utilizes one or more sealed chambers, each with two cavities, positioned to provide audio emissions to the wearer's ears. The cavities are separated by a common wall on which are mounted one or more transducers whose diaphragms communicate directly with the two cavities. When the transducer is driven at acoustic frequencies, it produces acoustic pressure within the cavities.

In one embodiment of the invention, one of the two cavities is sealed and the other has one or more tubular members or conduits leading from it. The outer ends of the tubes are placed in close proximity to the wearer's ears. In another embodiment of the invention, conduits or tubular members are attached to each of the cavities. The tubes lead from each of the two cavities and are directed and positioned to provide audio sounds to each of the wearer's ears.

Another embodiment of the invention combines the tube-sampled system with separate high frequency transducers. Electrical cross-over networks separate the signal frequencies into appropriate channels. Where two conduits or tubes from opposite sides of the dual cavity are utilized, the acoustic pressure is 180° out-of-phase. In this embodiment, the acoustic radiation is in the form of a dipole, and this reduces the net radiation to bystanders.

The sampling chambers are preferably positioned on the torso of the wearer, such as the chest, shoulders or lapel, and are either hollow or filled with a substantially acoustically transparent material, such as open-cell foam. The chambers are part of an enclosure or housing which can be conformed or made conformable to the wearer's body. The enclosures or housings also can be integrated into various types of clothing, such as vests, jackets, shirts or shawls as desired.

These and other objects, features and advantages of the present invention will become apparent from the following description of the invention when viewed in accordance with the attached drawings and appended claims.

DESCRIPTION OF THE DRAWINGS

FIG. 1 illustrates one embodiment of a sample chamber in accordance with the present invention;

FIG. 2 illustrates another embodiment of the present invention;

FIGS. 3–4 depict alternate possible wearable embodiments of the present invention;

BEST MODE(S) FOR CARRYING OUT THE INVENTION

Figure 5:
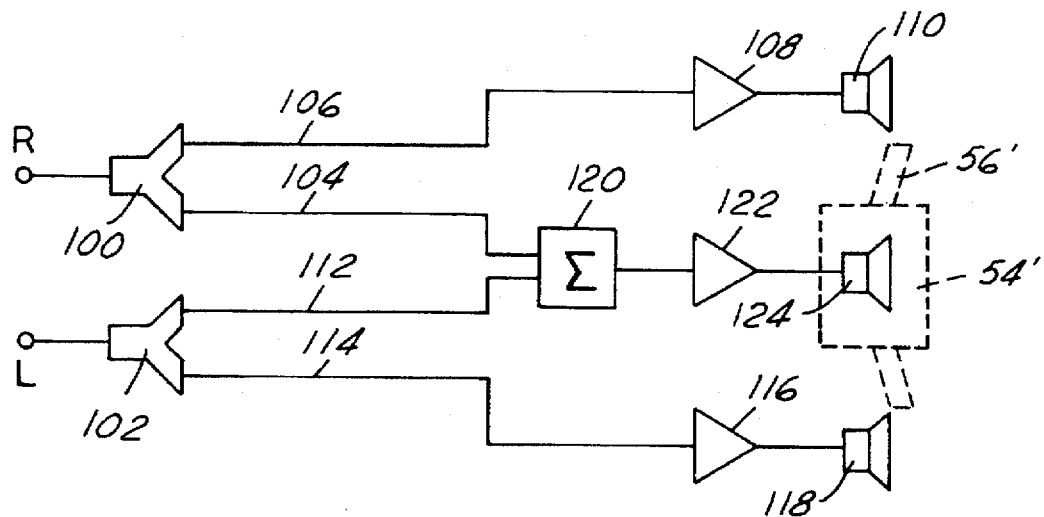
FIG. 5 illustrates a cross-over network for use with the present invention.

It is desirable to produce frequencies on the order of 80 Hz or less in order to achieve high fidelity performance comparable to what is commonly available from inexpensive earphones. Small enclosures of conventional design are unsatisfactory for this purpose. Also, compensating techniques such as vented "bass reflex" enclosures cannot be used for this purpose.

It is known that loud speaker transducers should be mounted in enclosures to confine the acoustic radiation from the rear portions or surface of the transducer so that it does not combine with the out-of-phase radiation from the front portions or surface. If the two radiations combine, a large reduction of net radiated intensity results, especially at low frequencies.

The combination of transducer and enclosure behaves like a high pass filter whose turnover frequency depends on several system parameters. These parameters include the free-space resonant frequency of the transducer, and the volume "V" of the sealed enclosure which acts to produce a restoring force for the diaphragm of the transducer. For small enclosures, such as those which might be worn on the body, the enclosure stiffness is likely to dominate the system. The system resonance in this region varies approximately as $\sqrt{1/V}$ and the low frequency turnover point becomes unacceptably high. For example, an enclosure whose dimensions are (10 cm)×(5 cm)×(1 cm) would produce a turnover frequency on the order of 600 Hz. Acoustical radiation below that frequency falls at a rate of 12 dB per octave for constant input. At 60 Hz, for example, the radiation is reduced by 40 db with respect to that above 600 Hz.

Transducers mounted on or in a sealed enclosure will exhibit resonant behavior. The frequency of the resonance depends on a number of parameters, principally the free space resonant frequency of the transducer and the volume of the enclosure. At frequencies significantly below the resonant frequency of the system, standard speaker enclosures and transducers cease to radiate useful acoustic power. At the same time, the transducer excursion for constant input continues at nominally constant amplitude. Therefore the acoustic pressure inside the enclosure can be sustained at a high level below the normal resonant frequency even though the radiated acoustic pressure is very small. The low frequency response inside the enclosure is maintained well beyond the usual limit for radiated sound.

It is to be understood that the term "transducer" used herein can refer to a single speaker or an array of two or more speakers.

One embodiment for providing enhanced low frequency response for wearable speakers is shown in FIG. 1 and designated by the reference numeral 10. The chamber has two cavities 12 and 14 which are separated by a common wall 16. One or more transducers 18 are mounted on the wall 16 and the diaphragms of the transducers communicate directly with the two cavities. When the transducer or transducers are driven at acoustic frequencies, they produce acoustic pressure within the cavities 12 and 14.

As shown in FIG. 1, cavity 14 is completely sealed (except for an atmospheric pressure equalizing leak). The other cavity 12 has a tube 20 leading to the outside serving as a conduit for sampling the internal acoustic pressure. The acoustic pressure is presented at the open end 22 of the tube 20. When the open end 22 is positioned adjacent the ear of a wearer, the hearing of the low frequencies of the system is enhanced.

One of the chambers 10 can be positioned adjacent each of the ears of the wearer. Alternately, the tube leading from chamber 12 can have two ends so one can be positioned adjacent each ear. This alternative is shown in phantom lines in FIG. 1 with the second fork of tube 20 labeled with reference numeral 20' and the second end labeled with reference numeral 22'.

The chambers and tubes for the system shown in FIG. 1 (and for the systems shown in FIGS. 2–4 described below) can be hollow. Preferably, however, the chambers and/or tubes are filled with an acoustically transparent material, such as an open-cell foam material. This particularly enables the use of soft, flexible body conforming wall materials.

A second embodiment of the invention is shown in FIG. 2. In this embodiment, the sample chamber 30 has a pair of cavities 32 and 34. The cavities are separated by a common wall 36 on which one or more transducers 38 are positioned. Tube 40 has an open end 42 which communicates with cavity 32. Tube 44 has an open end 46 which communicates with cavity 34.

With the embodiment of FIG. 2, the ends 42 and 46 of the tubes are positioned in proximity to the ears of a wearer. When the transducers 38 are driven at acoustic frequencies, they produce acoustic pressure within the cavities 32 and 34. The acoustic pressure is then presented to the wearer's ears through the tubes 40 and 44. In the embodiment shown in FIG. 2, the acoustic pressure will be nominally 180° out-of-phase at the ends of the tubes. In this regard, the acoustic radiation is in the form of a dipole (or doublet). This reduces radiation at distances significantly larger than the separation of the dipole sources. It also reduces possible noise to bystanders, particularly at low frequencies.

It is also possible to provide two or more conduits or tubular members from one or both cavities of the chamber 30.

A further description of a dipole is contained in commonly-owned U.S. patent application Ser. No. 08/400, 901, filed on Mar. 8, 1995 and entitled "Portable Speakers With Enhanced Low Frequency Response", the disclosure of which is hereby incorporated by reference herein. The present application also should be considered with the disclosure of commonly-owned U.S. patent application Ser. No. 08/483,759, entitled "Sampled Chamber Transducer With Enhanced Low Frequency Response" (attorney's docket number IRC 0119 PUS), which was filed concurrently with the present application and the disclosure of which is hereby incorporated by reference herein.

A known characteristic of chamber-tube systems such as the ones described above, is that the tube and cavities form a resonant system. This is commonly referred to as a Helmholtz resonator. The resonant frequency "$F_R$" is determined to first order by the cavity volume, the length of the tube, and the diameter of the tube.

At frequencies significantly below the resonant frequency, the outlet pressure in the tubes is approximately equal to the cavity pressure. There will be some attenuation, but for tubes with diameters and lengths appropriate for wearable speakers, this loss is generally negligible.

At frequencies above $F_R$, the tube outlet acoustic pressure for constant driver input falls at an asymptotic rate of about 6 dB per octave, modulated by resonances in the tube itself. Since the acoustic intensity is proportional to the square of the acoustic pressure, the intensity falls at about 12 lb per octave.

For each system or sample chamber, there will be a turnover or cross-over resonant frequency. Preferably the system is designed to have a resonant frequency on the order of 100–200 Hz or higher.

One of the features of the present invention is that the transducers which are employed to generate low frequencies within the chamber do not have to have a particularly low free resonant frequency. The overall efficiency of the system will be maximized when the chamber and cavities are as small as possible consistent with using a transducer or array with sufficient displacement to yield desired output acoustic pressures. Since small cavities produce high turnover frequencies, the individual transducers need only have resonant frequencies which are lower than the turnover frequency of the system. In this regard, the cavity volumes will generally dominate the determination of the resonance of the system.

The transducers and systems of the present invention are used to convey audio signals from various known electronic acoustical devices and convert them to audio transmitted to the wearer's ears. These devices include, for example, AM or FM radios, cassette tape players, CD players and cellular telephones.

In a preferred use of the present invention, the sample chambers are combined with separate high frequency transducers in an audio system. As indicated above, the sampled chambers create a preferential transmission of the lower audio frequencies and provide satisfactory sound at all frequencies. If desired for better high frequency sounds, the additional transducers can be provided.

A combined system is similar to "satellite" loudspeaker systems in which a low frequency unit, often called the "woofer", or "sub-woofer", driven monaurally, is complemented by two high frequency units driven in stereo. A system of this type is shown in FIG. 3 and designated by the numeral 50. The embodiment of the invention 50 is shown being worn by a wearer 52. The system 50 has a single two-cavity chamber 54 configured in the form of a pendant. This is worn with a "yoke" which has within it a pair of tubes 56 and 58 integrated in the form of thin flat narrow structures. Ends 57 and 59 of tubes 56 and 58, respectively, are open and have roughly rectangular cross sections. Ends 57 and 59 are positioned near the shoulder or collar of the wearer adjacent to the wearer's ears. Tube cross sections of other geometries, e.g. circular or ellipsoidal, may also be used.

The chamber 54 contains either a single transducer or an array of smaller transducers 55. The transducers are attached to a common wall in a manner similar to that shown above with respect to FIGS. 1 and 2.

A pair of high frequency transducers or arrays of transducers 60 and 62 are positioned at or near the open ends 57 and 59 of the system 50. The transducers 60 and 62 should be oriented or pointed toward the wearer's ears for maximum efficiency. It is also possible for the high frequency transducers to be mounted in other places on the wearer's torso or garment, such as on the collar.

An electrical cross-over network is used to separate the signal frequencies into the appropriate channels for the system 50. A representative network is shown in FIG. 5. In this regard, any subsidiary resonances in the tubes will not have any deleterious effect because there is not any significant driving signal at those frequencies. Nevertheless, however, it is desirable to provide additional dampening or compensation of the tube resonances for increased performance.

As shown in FIG. 5, the right "R" and left "L" stereo audio signals are each sent to frequency band splitters 100 and 102, respectively. The right audio signals are split into a first frequency band 104 which are the lower frequency signals, and a second frequency band 106 which are the higher frequency signals. The higher frequency R signals are amplified by amplifier 108 and used to drive "tweeter" speaker 110. Similarly, the left audio signals are split into a first frequency band 112 which are the lower frequency signals, and a second frequency band 114 which are the higher frequency signals. The higher frequency L signals are amplified by amplifier 116 and used to drive "tweeter" speaker 118. The R "tweeter" 110 is positioned near or adjacent to the right ear of the wearer, while the L "tweeter" 118 is positioned near or adjacent to the left ear of the wearer.

The two low frequency band signals 104 and 112 are combined by summer 120 and fed to amplifier 122. The combined low frequency signals are then used to drive speaker or transducer 124. As indicated in FIG. 5 in phantom lines, the transducer 124 is positioned in sampling chamber 54' and the acoustical signals are directed toward the wearer's ears by tubular members or conduits, 56' and 58'. In this manner, the wearer receives the full range of audio signal frequencies. In this regard, in this embodiment, the sampling chamber is similar to chamber 30 as shown in FIG. 2.

Figure 6:
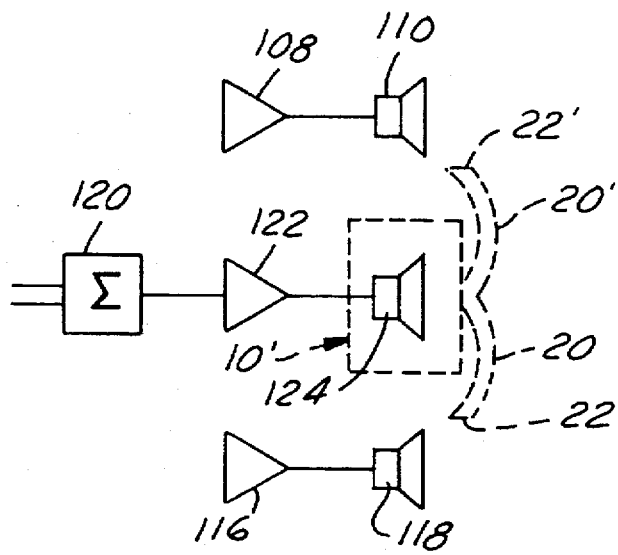
FIG. 6 illustrates a cross-over network for use with an alternate embodiment of the invention.

FIG. 6 illustrates the use of a sampling chamber similar to FIG. 1 with the system shown in FIG. 5. In FIG. 6, the R and L high frequency tweeters 110 and 118 are the same as those described above. For the low frequency bands, however, the sampling chamber 10' contains two chambers (one of which is sealed) and a forked or split tube 20, 20' which direct the audio signals to the wearer's ears by tube ends 22 and 22', respectively.

Another embodiment of the present invention uses enhancements to generate or improve the higher frequencies of the system. This could be accomplished by means of equalization, that is, driving the transducers harder at frequencies above the turnover or resonant frequency. Equalization may also be employed to suppress undesirable resonances.

FIG. 4 shows an alternate system for utilizing the present invention. In this system 70, two separate chamber systems 72 and 74 are provided, one for each of the ears of the wearer. Chamber system 72 has a sample chamber 76 and a sample tube 78. System 74 has a sample chamber 80 and a sample tube 82.

Each of the chamber systems 72 and 74 are two-cavity systems similar to that described above with reference to FIG. 1. In these systems, one or more transducers are attached to a common wall separating the two chambers. One of the chambers is sealed and the other is in communication with its respective tube 78 or 82.

With use of the system shown in FIG. 4, the sampling tubes 78 and 82 preferably are positioned so that they are vertically parallel to the wearer's neck and in close proximity to the ears. In this regard, the ends 84 and 86 of the tubes 78, 82 are open allowing the acoustic pressure to be presented directly to the wearer's ears.

Figure 7:
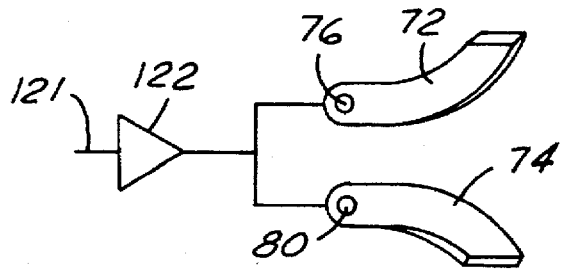
FIG. 7 illustrates a portion of a cross-over network for use with a pair of sample chambers shown in FIG. 1.

In a combined system, high frequency transducers 85 and 87 are positioned in the open ends 84 and 86 of the tubes 78, 82. The two systems 72 and 74 are connected electronically by wires or the like (not shown) and act together. This system also utilizes a cross-over network similar to that shown in FIG. 6 and discussed above. However, as shown in FIG. 7, the signal from the amplifier 122 is sent to the transducers in the chambers 76 and 80 of the two systems.

As indicated in FIGS. 3 and 4, the present invention is adapted to be worn by the wearer during normal activities. In this regard, although the systems 50 and 70 are shown as independent entities, they preferably are integrated into a wearable garment of some type, such as a vest, jacket, shirt, shawl or the like. With a shirt having a collar, the open ends of the tubes of the systems 50 and 70 are preferably positioned at or near the upper edge of the collar.

The type of garment utilized would depend on the individual utilizing the system, as well as the appropriate needs of fashion and other considerations, such as whether the garment has to be used for other purposes, (e.g. carrying additional items). A vest with a number of pockets or sections to hold the audio device, as well as the sample chamber or chambers and the tubular members, would provide a satisfactory garment for use of the present invention.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

It is claimed:

1. An audio system for producing high fidelity audio signals and adapted to be worn on the torso of a wearer, the audio signals including high frequency signals and low frequency signals, said audio system comprising:

at least one housing having at least two chambers with a common wall member separating said two chambers, first output transducer means mounted on said common wall member, a source of high fidelity audio signals, means connecting said source of audio signals to said first transducer means for driving said transducer means and producing low frequency acoustic pressure modulation signals in said two chambers, conduit means for transmitting said low frequency signals from at least one of said two chambers in a direction toward at least one ear of the wearer, said conduit means comprising at least one tubular member having a first end connected to said housing and a second end adapted to be positioned in proximity to an ear of the wearer, second output transducer means positioned adjacent said second end of said conduit means, means connecting said source of audio signals to said second transducer means for driving said second transducer means and producing high frequency audio signals therefrom, a wearable member adapted to be worn on the torso of a wearer, said housing and conduit means being attached to said wearable member, wherein when said system is worn with the housing being positioned on the wearer's torso and the conduit means positioned with said second ends adjacent the wearer's ears, the system provides to the wearer a low frequency and high fidelity response which approximates that provided by conventional head phones and ear phones that cover the wearer's ears and significantly block external sounds to the ears.

2. The audio system as set forth in claim 1 wherein said wearable member comprises a garment selected from the group comprising a vest, shirt, shawl, jacket, coat, sweater, sweatshirt.

3. The audio system as set forth in claim 1 wherein said conduit means is made from a pliable material which is conformable to the torso of the wearer.

4. The audio system as set forth in claims 1 or 3 in which said conduit means comprises a first conduit member for transmitting said signals to a first ear of the wearer and a second conduit member for transmitting said signals to a second ear of the wearer.

5. The audio system as set forth in claim 1 wherein said housing and said conduit means are made from a material which is conformable to the torso of the wearer.

6. The audio system as set forth in claim 1 in which said conduit means comprises a first conduit member for transmitting said signals to a first ear of the wearer and a second conduit member for transmitting said signals to a second ear of the wearer, and said second transducer means comprises a first transducer member positioned in said first conduit member and a second transducer member positioned in said second conduit member.

7. The audio system as set forth in claim 3 wherein said conduit means is filled with an open cell foam material.

8. The audio system set forth in claim 6 wherein said first and second conduit members are conformable to the torso of the wearer and filled with a substantially acoustically transparent material.

9. The audio system as set forth in claim 8 wherein said substantially acoustically transparent material comprises an open cell foam material.

10. The audio system as set forth in claim 1 wherein said source of audio signals is positioned in a pocket of said garment member, and said housing and conduit means are adapted to be integral parts of said garment.

11. The audio system as set forth in claim 1 wherein said garment member has a collar and said second end of said tubular member is positioned in said collar.

12. A wearable audio system for producing broad-band high fidelity audio signals to the ears of a wearer, the audio signals including high frequency signals and low frequency signals, said system comprising:

a wearable garment member for wearing on the torso of the wearer, a housing attached to said garment member and having two chambers with a common wall member separating said two chambers, a source of broad-band high fidelity audio signals in communication with said housing, first output transducer means mounted on said common wall member for producing low frequency audio signals, means connecting said source of audio signals to said first transducer means for driving said transducer means and producing said low frequency audio signals in said two chambers, a first tubular conduit member for transmitting said low frequency audio signals from one of said two chambers to a first ear of the wearer, said first tubular member having a first end connected to said housing and a second end adapted to be positioned on the torso of the wearer directed toward said first ear, a second tubular member for transmitting said low frequency audio signals from the second of said two chambers to a second ear of the wearer, said second tubular member having a first end connected to said housing and a second end adapted to be positioned on the torso of the wearer directed toward said second ear, second output transducer means positioned adjacent said second ends of both of said first and second conduit members, said second transducer means producing high frequency audio signals, means connecting said source of audio signals to said second transducer means for driving said second transducer means and producing said high frequency audio signals therefrom, said housing and said first and second tubular conduit members being attached to said wearable garment member, wherein broad-band high fidelity audio signals are transmitted to the two ears of the wearer without said conduit members covering or touching the wearer's ears or blocking environmental sounds.

13. The audio system as set forth in claim 12 wherein said garment member comprises a garment selected from the group comprising a vest, shirt, shawl, jacket, coat, sweater, sweatshirt.

14. The audio system as set forth in claim 12 wherein said housing and two tubular conduit members are conformable to the shape of the torso of the wearer.

15. The audio system as set forth in claim 12 wherein said two tubular conduit members are filled with an open-cell foam material.

16. The audio system as set forth in claim 12 wherein said source of audio signals includes a cross-over network for separation of the audio signals into the high frequency and low frequency audio signals.

17. The audio system as set forth in claim 12 wherein said first transducer means comprises at least two speaker members.

18. The audio system as set forth in claim 1 wherein two housings are provided on said wearable garment member, each of said housings having first and second transducer means and a tubular member, wherein said two housings produce broad-band high fidelity audio signals separately to the two ears of the wearer.

* * * * *

UNITED STATES PATENT AND TRADEMARK OFFICE
CERTIFICATE OF CORRECTION

PATENT NO. : 5,682,434 Page 1 of 1
APPLICATION NO. : 08/480231
DATED : October 28, 1997
INVENTOR(S) : James A. Boyden It is certified that error appears in the above-identified patent and that said Letters Patent is hereby corrected as shown below:

In column 4, line 46, delete "08/483,759" and insert -- 08/482,759 --, therefor.

Signed and Sealed this

Twenty-seventh Day of April, 2010

David J. Kappos
*Director of the United States Patent and Trademark Office*